United States Patent [19]

Hinkle

[11] 3,747,509

[45] July 24, 1973

[54] GRIDDLE

[75] Inventor: Joseph D. Hinkle, Rowland Heights, Calif.

[73] Assignee: Dam Fine Products Corporation, City of Industry, Calif.

[22] Filed: Dec. 23, 1971

[21] Appl. No.: 211,395

[52] U.S. Cl.................... 99/422, 99/447, 99/483
[51] Int. Cl..... A47j 37/10, A47j 27/12, A47j 36/24
[58] Field of Search..................... 99/422, 339, 423, 99/424, 425, 447; 126/24, 42

[56] References Cited
UNITED STATES PATENTS

| 1,707,532 | 4/1929 | Moon.................................. 99/339 |
| 1,908,806 | 5/1933 | Allen................................... 99/339 |
| 2,061,610 | 11/1936 | Burnette....................... 99/425 UX |
| 2,276,005 | 3/1942 | Vouvalidis........................... 99/422 |
| 2,751,840 | 6/1956 | Layton et al...................... 99/425 X |
| 3,615,146 | 10/1971 | Reaben............................... 99/339 |

FOREIGN PATENTS OR APPLICATIONS

| 221,348 | 5/1959 | Great Britain....................... 99/425 |
| 55,342 | 6/1935 | Norway............................... 126/24 |

Primary Examiner—Wayne A. Morse, Jr.
Assistant Examiner—Arthur O. Henderson
Attorney—Gordon L. Peterson

[57] ABSTRACT

A griddle including a bottom wall adapted to be placed on a heat source and a peripheral wall joined to the bottom wall and circumscribing at least a region of the bottom wall to thereby define at least one well into which food may be placed for cooking. Ribs are provided on the bottom wall and the bottom wall has sections at different elevations to thereby provide different surface temperatures on the griddle.

12 Claims, 7 Drawing Figures

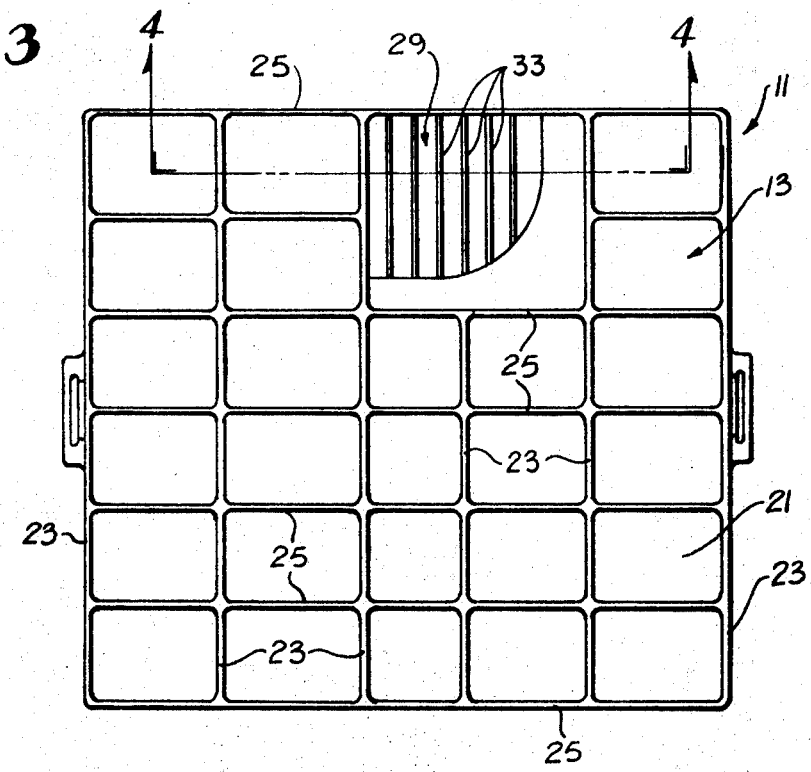
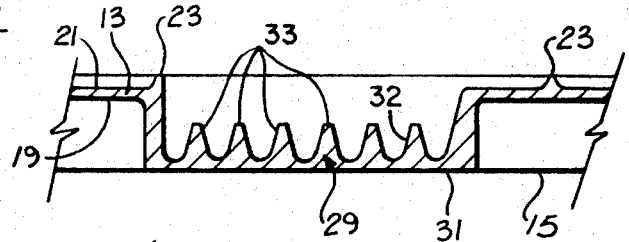
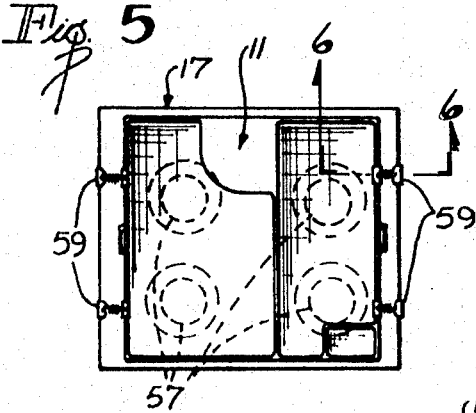
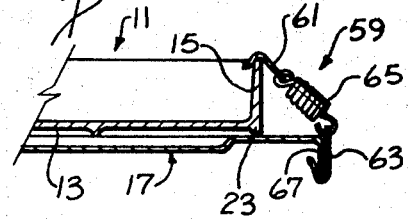
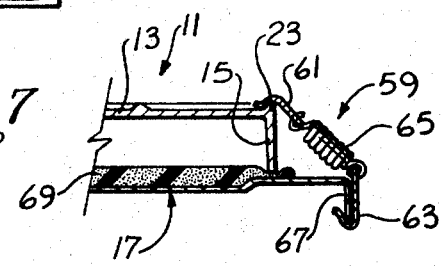

GRIDDLE

BACKGROUND OF THE INVENTION

Griddles are often placed on stoves or like heat sources and used for cooking. A griddle is particularly suited for camping because it saves space, and it can replace several cooking utensils.

Griddles are usually large and may cover several or all of the burners of a camp stove. One problem with a griddle is distribution of the heat to areas not directly above a burner. Another problem is that the griddle tends to warp due to heating. The warpage problem is particularly troublesome with large griddles.

A solution to these problems is to increase the mass of the bottom wall of the griddle. The greater mass serves to maintain a more even surface temperature throughout the bottom wall and it increases the strength of the bottom wall. However, this increases the weight and the cost of the griddle. The increased weight is particularly undesirable for camping.

If a griddle is to satisfactorily replace multiple cooking utensils, it must have separate compartments for different foods, and it must have regions at different temperatures. For example, it may be desirable to maintain one area of the griddle relatively hot for one purpose such as frying food and simultaneously maintain another area of the griddle at a lesser temperature, for another purpose such as keeping food or coffee warm. Another problem to which the present invention is directed is providing a griddle with sections which can be maintained at different temperatures.

SUMMARY OF THE INVENTION

The present invention provides a griddle which thoroughly and evenly distributes the heat from the heat source. This is accomplished by providing heat distribution ribs on the bottom or heatable wall of the griddle. The ribs increase the mass of the bottom wall therealong and increase the ability of the bottom wall to distribute heat and to maintain an even surface temperature.

The use of ribs is a substantial advance over the use of a griddle with a very thick bottom wall. For example, the griddle of this invention is lighter and much less expensive. Also, the heavy griddle takes longer to heat up. In addition, the ribs impart strength to the griddle to prevent warping.

The griddle of this invention has one or more selected sections which remain at a lower temperature than the other sections of the griddle. Several features which are useable individually cooperate to produce this result. First, the bottom wall is elevated at the region where a reduced temperature is desired. Second, the raised reduced temperature section may have an increased mass and a relatively large surface area for heat radiation. Specifically, mass per square inch of surface is made greater than the mass per square inch of surface of the other sections of the bottom wall. The incrase in mass and surface area may be provided by ribs on the lower surface of the reduced temperature region. Third, the heat distribution ribs of the bottom wall terminate outside of the reduced temperature region.

In elevating the reduced temperature region, the upper and lower surfaces thereof are preferably above the upper and lower surfaces, respectively, of the other sections of the bottom wall. The sections of the bottom wall which are maintained at different temperatures may be constructed of the same materials.

The present invention also provides a coupling for attaching the peripheral wall of the griddle to the stove or other heat source. By attaching the griddle to the stove, it cannot be knocked off of the stove. This is particularly advantageous for crowded camping vehicles where the probability of the griddle being knocked off of the stove is increased.

Another important function of the coupling is attachment of the griddle to the stove during transit. This obviates the need for using storage space within the recreational vehicle for the griddle and firmly mounts the griddle so that it will not be damaged or cause damage as the vehicle moves. In a preferred construction, a pad of soft compressible material is placed between the stove and the inverted griddle. At least two of the couplings are used to attach opposite regions of the griddle to the stove.

In a preferred construction, each of the couplings includes a hook-like member adapted to fit over an appropriate projection of the griddle, a connector for attachment to the stove and resilient means such as a spring for joining the hook-like member and the connector. The hook-like member may fit over the upper edge of the peripheral wall when the griddle is in the upright position. When the griddle is inverted, the hook-like member may fit over one of the heat distribution ribs on the bottom wall of the griddle.

The invention can best be understood by reference to the following description taken in connection with the accompanying illustrative drawings.

BRIEF DESCRIPTION OF THE DRAWINGS

FIG. 3 is a bottom plan view of the griddle.

FIG. 4 is an enlarged fragmentary sectional view taken generally along line 4—4 of FIG. 3 and illustrating the section of reduced temperature with this section being in the inverted position.

FIG. 5 is a top plan view illustrating how the coupling attaches the griddle to a stove.

FIG. 6 is an enlarged sectional view taken generally along line 6—6 of FIG. 5.

FIG. 7 is a sectional view similar to FIG. 6 showing how the couplings can be used to attach an inverted griddle to the stove.

DESCRIPTION OF THE PREFERRED EMBODIMENT

Figure 1:
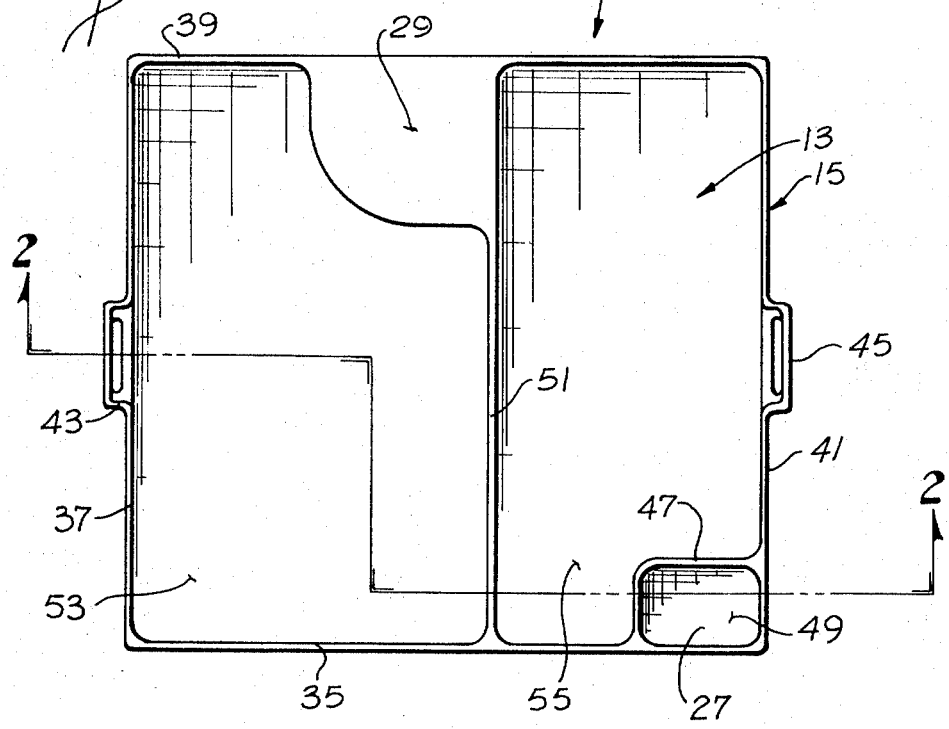
FIG. 1 is a top plan view of a griddle constructed in accordance with the teachings of this invention.
Figure 2:
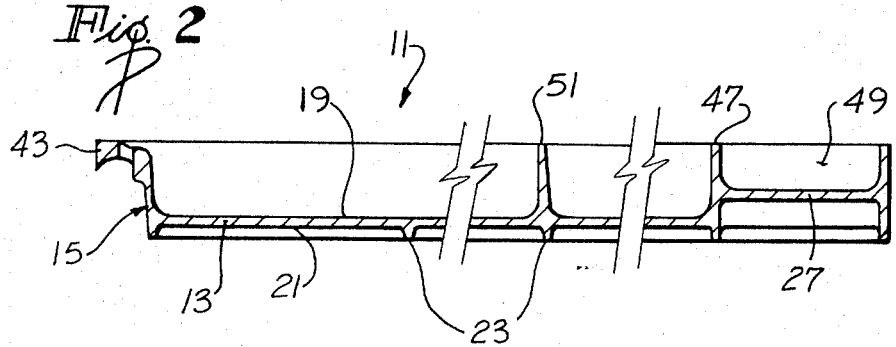
FIG. 2 is an enlarged sectional view taken generally along line 2—2 of FIG. 1.

FIGS. 1–3 show a griddle 11 which generally includes a heatable or bottom wall 13 and a peripheral wall 15. The griddle 11 is preferably integrally cast from a suitable ferrous metal. Although the griddle 11 is rectangular in plan, it should be understood that the griddle may be of various configurations.

The bottom wall 13 is adapted to be placed on a heat source such as a stove 17 (FIG. 5). The bottom wall 13 has an upper surface 19 and a lower surface 21 (FIG. 2) which is adapted to confront the stove 17. The upper surface 19 may be covered with a suitable layer of material such as teflon to prevent food from sticking to the bottom wall 13. The bottom wall 13 has a first group of heat distribution ribs 23 (FIG. 3) extending in a first direction and a second group of heat distribution ribs 25 extending transverse to the ribs 23 and intersecting some of the ribs 23. The ribs 23 and 25 are continuous and uninterrupted. The ribs 23 and 25 intersect to form a rectangular grid on the lower face 21. The ribs 23 and 25, in effect, thicken the bottom wall 13 along the ribs and provide additional mass for the bottom wall.

The number, size, orientation, and distribution of the ribs 23 and 25 can be varied depending upon the results desired. The ribs distribute the heat and therefore tend to cause all of the regions of the bottom wall 13, at the same elevation relative to the stove 17, to be at substantially the same temperature. The ribs also serve to stiffen the bottom wall against warping or bending. In order to optimize heat distribution, and to stiffen the bottom wall 13 against bending in both directions, the ribs 23 and 25 preferably extend transversely to each other.

To reduce the weight of the griddle 11 and to reduce the cost of materials therefor, the number and size of the ribs 23 and 25 should be the minimum necessary to provide the heat distribution required and the necessary stiffness against warping. In the embodiment illustrated, the spacing between the ribs 25 is substantially equal and the spacing between the ribs 23 is also substantially equal except for a slightly narrow spacing between the two central ribs 23. Of course, other spacings and orientations of the ribs 23 and 25 may be used.

The bottom wall 13 has elevated sections 27 (FIG. 2) and 29 (FIGS. 1, 3 and 4). The elevated section 27 is of substantially the same thickness as the lower portions of the bottom wall 13. The elevation of the section 27 above the heat source causes that section to be at a lower temperature than the lower sections of the wall 13. As shown in FIG. 4, the upper surface 31 and the lower surface 32 of the section 29 lie above the upper surface 19 and the lower surface 21, respectively. Moreover, in the embodiment illustrated the lower surface 32 also lies above the upper surface 19 of the bottom wall 13.

The section 29 is elevated so that its upper surface 31 is flush with the top of the peripheral wall 15 as shown in FIG. 4. The weight or mass of the section 29 per square inch of the surface 31 is greater than the weight or mass of the lower section of the bottom wall per square inch of the upper surface 19. In the embodiment illustrated, this additional mass is provided by a series of parallel ribs 33 (FIGS. 3 and 4) which extend for the full length of the section 31. The ribs 33 also provide additional surface area for heat radiation. The heat distribution ribs 21 and 23 do not extend into the section 29 (FIG. 3). The section 29 may be located in various positions; however, in the embodiment illustrated it is located adjacent the periphery of the griddle 11. Although one side of the section 29 is curved in plan as shown in FIGS. 1 and 3, the section 29 may have other configurations in plan, if desired.

The peripheral wall 15 circumscribes substantially all of the bottom wall 13. The peripheral wall 15 includes side walls 35, 37, 39 and 41. Apertured handles 43 and 45 are formed integrally with the side walls 37 and 41, respectively. A partition 47 extends between the side walls 35 and 41 and wraps around the section 27 of the bottom wall to form a shallow well 49 which may be used, for example, as a well for heating syrup, butter, or other material which is to be warmed as opposed to cooked.

Another partition 51 extends between the side walls 35 and 39. As shown in FIG. 1, the section 29 is integral with the side wall 39 and the partition 51. As shown in FIG. 2, the upper ends of the peripheral wall 15, the partitions 47 and 51 and the surface 31 (FIG. 4) are all flush. The partition 51 divides the griddle 11 into wells or compartments 53 and 55.

In use of the griddle 11, it is placed on the stove 17 above a plurality of burners 57. A plurality of couplings (four being illustrated) 59 are used to attach or mount the griddle 11 on the stove 17. The couplings 59 are identical.

As shown in FIG. 6, each of the couplings 59 includes a hook-like member 61, a connector 63, and a spring 65 for interconnecting the member and the connector. The member 61 and the connector 63 may each be constructed of sheet metal. The member 61 hooks over a suitable projection such as the upper end of the peripheral wall 15 and the connector 63 has a hook portion which receives a flange 67 on the stove 17. The coupling 59 is sized so that when it is installed as shown in FIG. 1, the spring 65 is in tension. For this reason, the spring holds the griddle 11 resiliently against the stove 17.

The griddle 11 can be stored in an inverted position as shown in FIG. 7. By storing the griddle in an inverted position, the interior will not become dirty. In addition, by storing the griddle 11 on the stove 17, the griddle does not take up storage space. As shown in FIG. 7, the couplings 59 operate in the same manner described hereinabove with reference to FIGS. 5 and 6 except that the hook-like member 61 cooperates with the upwardly protruding peripheral rib 23 of the inverted griddle. In addition, to prevent rattling, a pad 69 of compressible material such as foam plastic is provided between the griddle 11 and the stove 17. The couplings 59 hold the griddle 11 tightly against the pad 69 with the peripheral wall 15 of the griddle engaging and deforming the pad 69.

Although an exemplary embodiment of the invention has been shown and described, many changes, modifications and substitutions may be made by one skilled in the art without necessarily departing from the spirit and scope of this invention.

I claim:

1. A griddle comprising:
   a heatable wall adapted to be placed on a heat source;
   a peripheral wall joined to said heatable wall and circumscribing at least a region of said heatable wall to thereby define at least one well into which food may be placed for cooking;
   said heatable wall having first and second sections, each of said sections having upper and lower surfaces, each of said upper surfaces being sufficiently broad to perform a cooking or food heating function;
   at least substantial portions of said upper and lower surfaces of said first section being at greater elevations above the heat source than the elevations of the upper and lower surfaces, respectively, of the second section above the heat source when the heatable wall is on the heat source;
   said first and second sections being constructed of substantially the same material; and
   said first section having a greater mass per square inch of the upper surface thereof than the mass per square inch of the upper surface of said second section.

2. A griddle as defined in claim 1 including resilient means for attaching the peripheral wall to the heat source.

3. A griddle as defined in claim 1 wherein said lower surface of said first section defines a plurality of ribs.

4. A griddle as defined in claim 1 wherein said second section is in said well, said first section is outside of said well and adjacent the periphery of the griddle.

5. A griddle as defined in claim 1 wherein said heatable wall has a third section which is at a greater elevation above the heat source than the elevation of the second section above the heat source when the heatable wall is on the heat source.

6. A griddle as defined in claim 1 wherein the lower surface of said region of said heatable wall includes a plurality of heat distribution ribs to maintain the temperature throughout the upper surface of the heatable wall relatively even and to strengthen the heatable wall.

7. A griddle as defined in claim 6 wherein said heat distribution ribs do not extend into said first section.

8. A griddle as defined in claim 1 wherein the lower surface of said first section defines a plurality of ribs, said ribs increasing the mass of said first section, said ribs terminating above said upper surface of said second section, the upper surface of said first section being substantially flat.

9. A griddle as defined in claim 8 including a plurality of heat distribution ribs on the lower surface of said second section, said heat distribution ribs not extending into said first section.

10. A griddle as defined in claim 9 wherein said second section is in said well, said first section is outside of said well and adjacent the periphery of the griddle, said heatable wall has a third section which is at a greater elevation above the heat source than the elevation of the second section above the heat source when the heatable wall is on the heat source, and including resilient means for attaching the peripheral wall to the heat source.

11. A griddle comprising:
a heatable wall adapted to be placed on a heat source;
a peripheral wall joined to said heatable wall and circumscribing at least a region of said heatable wall to thereby define at least one well into which food may be placed for cooking;
said heatable wall having first and second sections, each of said sections having upper and lower surfaces, each of said upper surfaces being sufficiently broad to perform a cooking or food heating function;
at least substantial portions of said upper and lower surfaces of said first section being at greater elevations above the heat source than the elevations of the upper and lower surfaces, respectively, of the second section above the heat source when the heatable wall is on the heat source;
said first and second sections being constructed of substantially the same material; and
said lower surface of said first section defining a plurality of ribs which terminate above the lower surface of said second section and said upper surface of said first section being substantially flat.

12. A griddle as defined in claim 11 wherein said ribs terminate above the upper surface of said second section and said griddle includes a plurality of heat distribution ribs on the lower surface of said second section, said heat distribution ribs not extending into said first section.

* * * * *